Nov. 20, 1923.
H. J. ROUND
1,474,382
APPARATUS FOR WIRELESS TELEGRAPHY AND TELEPHONY
Filed March 31, 1920
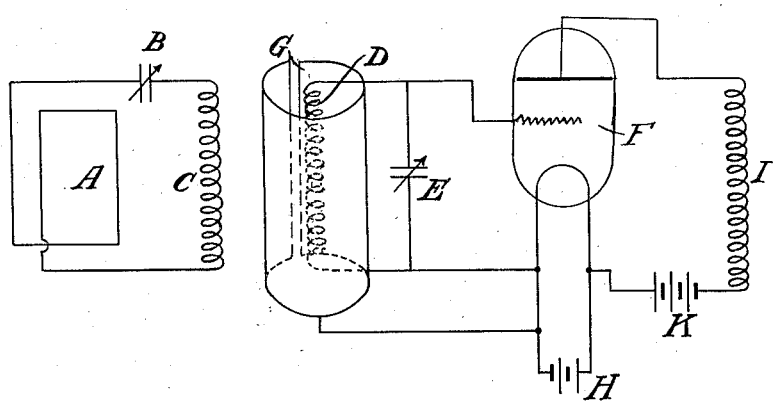
Henry Joseph Round
Inventor
By Ira J. Adams
atty.

Patented Nov. 20, 1923.

1,474,382

UNITED STATES PATENT OFFICE.

HENRY JOSEPH ROUND, OF LONDON, ENGLAND, ASSIGNOR TO THE RADIO CORPORATION OF AMERICA, OF NEW YORK, N. Y., A CORPORATION OF DELAWARE.

APPARATUS FOR WIRELESS TELEGRAPHY AND TELEPHONY.

Application filed March 31, 1920. Serial No. 370,176.

*To all whom it may concern:*

Be it known that I, HENRY JOSEPH ROUND, a subject of the King of Great Britain, residing at 9 Woodberry Crescent, Muswell Hill, London, England, have invented new and useful Improved Apparatus for Wireless Telegraphy and Telephony, of which the following is a specification.

In apparatus comprising three electrode valves dependent for their working upon the mere change of potential of the grids troubles frequently arise owing to the effects of parasitic capacities.

In order to obtain maximum sensitiveness the maximum potential obtainable from the available energy is usually applied to the grid. This is done by connecting the grid to one end of a winding of minimum self-capacity, the other end of which is connected to the battery which heats the filament. The capacity of this battery is of course larger than that of the grid and in consequence a change of charge in a neighbouring aerial gives rise to greater variations of potential at the grid end of the winding than at the battery end thereof so that a difference of potential is created between the ends of the winding no matter what is the cause of the initial variation in charge.

According to this invention the winding is enclosed in a metal screen or sheath so arranged as not to form a completely closed circuit, and the sheath is connected to the battery which heats the filament. The effect of this arrangement is that no difference of potential as mentioned above will occur.

The invention is illustrated by the accompanying diagram. A is an aerial system including a variable condenser B and the primary C of a transformer of which the secondary D is connected to a condenser E and to the grid and filament of a valve F. The winding D may be so arranged that its self-capacity is a minimum. Around this winding is placed a sheath G formed of a metal sheet bent so that its edges nearly but not quite meet and connected to the filament battery H.

The anode and filament of the valve F are connected as is usual to an inductance I and a battery K.

In direction finding work when using frame aerials the forced currents produced in the frame system acting as a plain vertical aerial through its capacity to earth are liable to give a potential difference between the grid and filament. This potential difference being independent of the direction of the frame distorts the normal frame diagram.

By the insertion between the frame and the coil attached to the receiver of the above screening sheet connected as shown to the filament battery this error is avoided.

In simple reception on a vertical aerial with a valve, the valve grid and battery are commonly connected across the aerial tuning inductance. This arrangement simplifies tuning, but has the disadvantage of permitting very short forced waves to affect the grid, the inductance being much too great an impediment for them. The effect of these short waves is eliminated by employing a metal sheath as beforesaid connected to the valve battery and arranged in between the two windings of a tightly coupled transformer, of, say 1/1 ratio.

In both these arrangements the invention is of especial value in aeroplane work where magneto induction is a serious matter.

What I claim is:—

1. In a wireless receiver, the combination with an aerial circuit containing a primary winding of a secondary winding, a condenser connected across the ends of the secondary winding, a valve containing a filament, a grid and an anode, the filament and grid being connected in series with the secondary winding, a battery adapted to heat the filament and a metal sheath surrounding the secondary winding and connected to the battery.

2. In a wireless receiver, the combination with an aerial circuit containing a primary winding, of a secondary winding, a condenser connected across the ends of the secondary winding, a valve containing a filament, a grid and an anode, the filament and grid being connected in series with the secondary winding, a battery adapted to heat the filament and a slotted metal sheath surrounding the secondary winding and connected to the battery.

HENRY JOSEPH ROUND,